ANALOG COMPUTER CIRCUIT FOR MULTIPLICATION OR DIVISION

Filed Feb. 6, 1968 2 Sheets-Sheet 1

INVENTOR.
EARL LE VELL TIPPETTS
BY
Christie, Parker & Hale
ATTORNEYS.

July 21, 1970 E. LE VELL TIPPETTS 3,521,046

ANALOG COMPUTER CIRCUIT FOR MULTIPLICATION OR DIVISION

Filed Feb. 6, 1968 2 Sheets-Sheet 2

INVENTOR.
EARL LEVELL TIPPETTS
BY
Christie, Parker & Hale
ATTORNEYS.

United States Patent Office 3,521,046

Patented July 21, 1970

3,521,046

ANALOG COMPUTER CIRCUIT FOR MULTIPLICATION OR DIVISION

Earl Le Vell Tippetts, Manhattan Beach, Calif., assignor to Lear Siegler, Inc., Santa Monica, Calif., a corporation of Delaware Filed Feb. 6, 1968, Ser. No. 703,378
Int. Cl. G06g *7/16*
U.S. Cl. 235—195 12 Claims

ABSTRACT OF THE DISCLOSURE

A single circuit performs analog division or multiplication, depending upon the position of an operation selection switch. In division, a divisor signal is applied to a first integrator and a dividend signal is applied to a second integrator. The output of the first integrator and the output of a reference voltage source are coupled to the inputs of a comparator. When the comparator senses amplitude identity at its inputs, the output signal from the second integrator, which represents the quotient of the dividend and divisor signals, is sampled. In multiplication, the reference voltage source is coupled to the input of the first integrator and a multiplicand signal is coupled to the input of the second integrator. The output of the first integrator and a multiplier signal are coupled to the inputs of the comparator. In this case, the output signal from the second integrator represents the product of the multiplicand and multiplier signals, when the comparator senses amplitude identity at its inputs.

BACKGROUND OF THE INVENTION

This invention relates to analog computation and, more particularly, to a circuit for performing division and/or multiplication on analog signals.

The division and multiplication operations are basic to analog computers. It is common to execute these operations electromechanically with a potentiometer and a servomechanism that adjusts the sliding contact of the potentiometer. Typical electromechanical arrangements of this type are illustrated in the text "Electronic Analog Computers" by Korn and Korn, McGraw Hill Book Co., Inc., 1952, at pages 15 and 231.

An electromechanical arrangement for performing a function is in general bulkier, less reliable, and more expensive than its electronic counterpart that performs the function without any mechanical parts. For this reason, division and multiplication operations are often performed in analog computers by operational amplifiers in which the output voltage is proportional to the product of the input voltage times the ratio of the feedback impedance to the input impedance. These electronic arrangements typically suffer from instability. This is especially true of the conventional operational amplifier for analog division, which is illustrated in the text "Computer Handbook" by Huskey and Korn, McGraw Hill Book Co., Inc., 1962, at pages 3–58. This operational amplifier employs a variable multiplier in its feedback path whose setting is controlled by the divisor signal, while the dividend signal is applied to the input of the operational amplifier. The use of the variable multiplier in the feedback path of the operational amplifier introduces a large variation into the open loop gain and phase characteristics, thereby making it difficult to stabilize the operational amplifier.

SUMMARY OF THE INVENTION

The invention contemplates an electronic analog division and/or multiplication circuit arrangement that eliminates the instability typically found in the prior art electronic arrangements. Specifically, a source of first signals to be operated upon, a source of second signals to be operated upon, and a source of reference signals are involved. The first signal or the reference signal, depending upon the operation, is integrated and the integrated signal is compared in amplitude with the other signal, namely the reference signal or the first signal. The second signal is also integrated. The integrated second signal is sampled responsive to the attainment of a predetermined amplitude relationship between the compared signals. The sample represents the results of the division or multiplication operation.

In the case of division, the first signal, which represents a divisor is integrated, the reference signal is compared with the integrated divisor signal, and the second signal represents a dividend. Consequently, the sampled signal represents the quotient of the dividend and divisor signals.

In the case of multiplication the reference signal is integrated, the first signal, which represents a multiplier, is compared with the integrated reference signal, and the second signal represents a multiplicand. Consequently, the sampled signal represents the product of the multiplier and multiplicand signals.

BRIEF DESCRIPTION OF THE DRAWINGS

The features of a specific embodiment of the invention are illustrated in the drawings, in which.

DESCRIPTION OF A SPECIFIC EMBODIMENT

Figure 1:
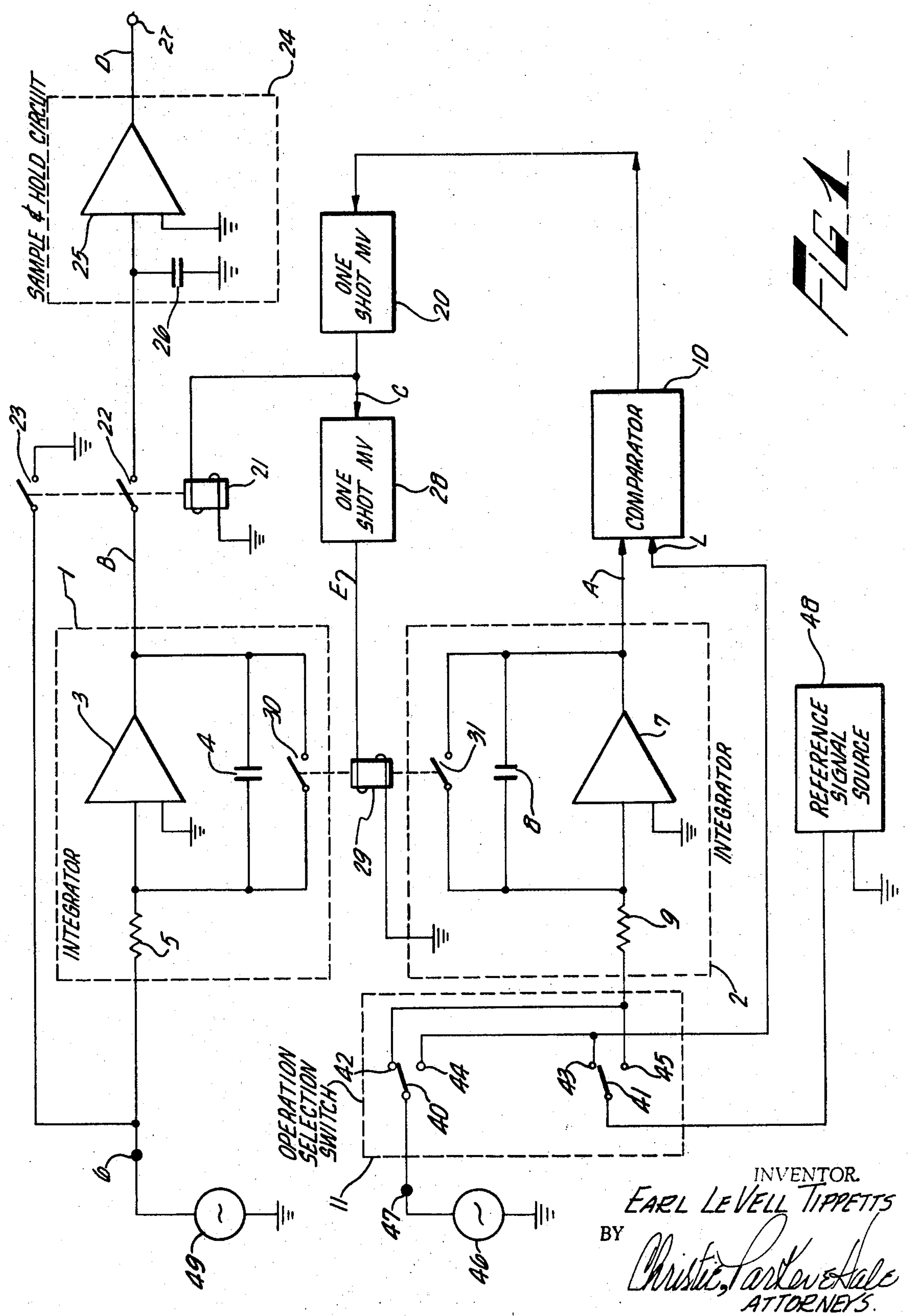
FIG. 1 is a schematic diagram of an analog computer circuit incorporating the principles of the invention.
Figure 2:
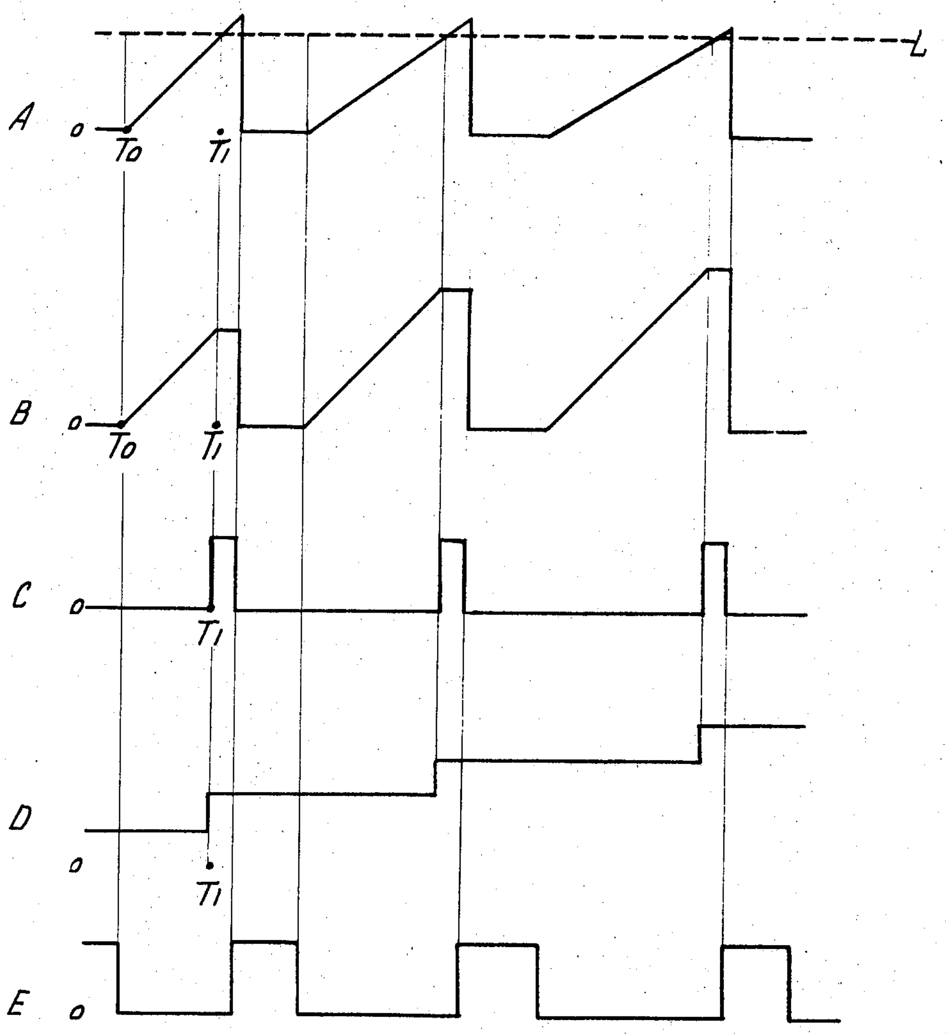
FIG. 2 is a diagram of the wave forms appearing at different points in the circuit of FIG. 1.

Reference is now made to FIGS. 1 and 2 for a description of the construction and operation of an embodiment of the invention. The wave forms designated A through E in FIG. 2 represent the signals as a function of time appearing at the points in the circuit of FIG. 1 with the same letter designations.

In FIG. 1, integrators 1 and 2 are shown. Although integrators 1 and 2 could be any device that performs the integration operation, operational amplifiers are disclosed. Integrator 1 comprises a conventional amplifier stage 3 with a feedback capacitor 4 connected between its input and output, and a resistor 5 connected between an input terminal 6 and the input of amplifier stage 3. Similarly, integrator 2 comprises a conventional amplifier stage 7 with a feedback capacitor 8 connected between its input and output, and an input resistor 9 connected between an operation selection switch 11 and the input of amplifier stage 7.

A comparator 10 has one input connected to the output of integrator 2 and another input to which a threshold level determining signal is applied. Comparator 10 could be a bistable circuit whose output is in one state when the amplitude of the signal on one input is smaller than the signal on the other input and vice versa. Thus, the output of comparator 10 gives an indication when amplitude identity occurs at its inputs.

Assuming that integrators 1 and 2 are initially cleared at a time $T_0$, the signals at their outputs rise as a function of time from ground at slopes dependent upon the amplitudes of the signals at their inputs. The outputs signals from integrators 2 and 1 are represented by wave forms A and B, respectively, in FIG. 2. When the signal at the output of integrator 2 rises above a threshold level, designated L in FIG. 2, at a time $T_1$, the output of comparator 10 changes state. The time interval $T_1-T_0$ is directly proportional to the amplitude of the threshold level and inversely proportional to the amplitude of the signal applied to the input of integrator 2.

The output of comparator 10 is connected to a monostable or one-shot multivibrator 20. The output of one-shot multivibrator 20 drives a relay coil 21 that controls normally open contacts 22 and 23. Normally open contact 23 connects input terminal 6 to ground and normally open contact 22 connects the output of integrator 1 to a sample and hold circuit 24 that comprises a conventional amplifier stage 25 with a capacitor 26 shunted across its input. The output of amplifier 25 is connected to an output terminal 27.

When the state of the output of comparator 10 changes at time $T_1$, it triggers one-shot multivibrator 20, which produces a pulse of fixed duration as represented by wave form C in FIG. 2. This pulse energizes relay coil 21 and closes contacts 22 and 23. As a result, the amplitude of the signal at the output of integrator 1 at time $T_1$, which is directly proportional to the amplitude of the signal at the input of integrator 1 and to the time duration $T_1-T_0$, is sampled. Contact 22 remains closed sufficiently long for capacitor 26 to charge to the voltage appearing across the output of integrator 1 at time $T_1$. At the same time, the input of integrator 1 is grounded so that its output voltage cannot change during sampling. After the termination of the pulse produced by one-shot multivibrator 20, contacts 22 and 23 open again. Thus, the amplitude of the signal at the output of integrator 1 at time $T_1$ is stored across capacitor 26 until the output signal of integrator 1 is sampled again. The signal appearing at output terminal 27 is proportional to the voltage stored by capacitor 26.

The output of one-shot multivibrator 20 is also coupled to the input of a one-shot multivibrator 28. Multivibrator 28 drives a relay coil 29 that controls normally open contacts 30 and 31. Contact 30 is connected in parallel with capacitor 4 of integrator 1 and contact 31 is connected in parallel with capacitor 8 of integrator 2. One-shot multivibrator 28 is triggered by the trailing edge of each pulse produced by one-shot multivibrator 20, as represented by wave forms C and E in FIG. 2. When it is triggered, one-shot multivibrator 28 produces a pulse of fixed duration that energizes relay 29 and short circuits capacitors 4 and 8, thereby clearing integrators 1 and 2, respectively, i.e., forcing the signal at their outputs to ground or some other reference level.

In summary, integrators 1 and 2 operate cyclically, being enabled i.e., beginning to integrate, simultaneously each time relay coil 29 is deenergized, i.e., each time contacts 30 and 31 open. When the output of integrator 2 rises above the threshold level of comparator 10, relay coils 21 and 29 are energized in succession responsive to the change in state of the output of comparator 10. While relay coil 21 is energized, the output signal of integrator 1 is sampled through normally open contact 22. Accordingly, the signal at output terminal 27 has a stepped appearance as represented by wave form D in FIG. 2. The width of the steps corresponds to the duration of integrator cycles, which must in any case be smaller than the reciprocal of twice the highest frequency component of the signals being operated upon.

The described circuit is capable of executing an analog division or multiplication operation, depending upon the state of operation selection switch 11. Switch 11 comprises ganged wiper arms 40 and 41 that make contact with terminals 42 and 43, respectively, in one position and treminals 44 and 45, respectively, in the other position. Terminals 42 and 45 are connected to the input of integrator 2 and terminals 43 and 44 are connected to the threshold level determining input of comparator 10. A source 46 of signals to be operated upon is coupled through an input terminal 47 to wiper arm 40 and a source 48 of reference signals is coupled to wiper arm 41. Reference signal source 48 could be a battery or other source of signals having a constant amplitude. A source 49 of signals to be operated upon is coupled to input terminal 6.

When the division operation is to be executed, switch 11 is placed in the state shown in FIG. 1. In this case, the signal from source 46, which represents a divisor, is coupled through wiper arm 40 and terminal 42 to the input of integrator 2. The reference signal from source 48, the amplitude of which determines the threshold level in this case, is coupled through wiper arm 41 and terminal 43 to the input of comparator 10. The time interval required for the signal at the output of integrator 2 to rise to the threshold level at time $T_1$ from ground at time $T_0$ is expressed by the equation:

$$T_1-T_0=\frac{R}{k_1X}$$

where $k_1$ is the reciprocal of the time constant of resistor 9 and capacitor 8, R is the amplitude of the reference signal, and X is the amplitude of the signal from source 46 during the integrating cycle—in other words, the divisor. Similarly, the amplitude of the signal at the output of integrator 1 at the time of sampling, i.e., at time $T_1$, is expressed by the equation:

$$Z=k_2Y(T_1-T_0)$$

where $k_2$ is the reciprocal of the time constant of resistor 5 and capacitor 4, Z is the amplitude of the signal at the output of integrator 1, and Y is the amplitude of the signal from source 49 during the integrating cycle, i.e., the dividend. Combining the preceding two equations, the amplitude of the signal at the output of integrator 1 at the sampling time is expressed by the equation:

$$Z=\left(\frac{k_2R}{k_1}\right)\left(\frac{Y}{X}\right)$$

Since $k_1$, $k_2$, and R are constants, the amplitude of the signal at the output of integrator 1 at the sampling time is directly proportional to Y divided by X. In other words, the amplitude represents the quotient of the signal amplitudes from sources 46 and 49.

When the multiplication operation is to be executed, switch 11 is placed in its other state. In this case, the reference signal from source 48 is coupled through wiper arm 41 and terminal 45 to the input intergator 2 and the signal from source 46, which represents a multiplier, is coupled through wiper arm 40 and terminal 44 to comparator 10 to determine the threshold level. The time interval required for the signal at the output of integrator 2 to rise to threshold level at time $T_1$ from ground at time $T_0$ in this case is expressed by the equation:

$$T_1-T_0=\frac{X}{k_1R}$$

The signal from source 49 represents a multiplicand in this case. As in the case of division, the amplitude of the signal at the output of integrator 1 at the time of sampling is represented by the equation:

$$Z=k_2Y(T_1-T_0)$$

By combining the preceding two equations, the amplitude of the signal at the output of integrator 1 in the case of multiplication is expressed by the equation:

$$Z=\left(\frac{k_2}{k_1R}\right)(XY)$$

Since $k_1$, $k_2$, and R are all constants, the amplitude at the output of integrator 1 is directly proportional to Y times X. In other words, this amplitude represents the product of the signal amplitudes from sources 46 and 49.

The circuit shown in FIG. 1 should be designed so the frequency of the integrating cycle is larger than twice the highest frequency component of the signals from sources 46 and 49 for all cases.

What is claimed is:

1. An analog computer circuit comprising:

a first analog signal source;

a second analog signal source;

a reference source;

a comparator having first and second inputs and an output that produces an indication when the signals at the first and second inputs assume a predetermined relationship;

a first integrator;

first means for coupling the first integrator between the first signal source and the first input of the comparator;

second means for coupling the reference source directly to the second input of the comparator;

a second integrator;

third means for coupling the second signal source directly to the input of the second integrator; and means for sampling the output signal of the second integrator responsive to the indication of the comparator.

2. The analog computer circuit of claim 1, additionally comprising: means for disconnecting the first coupling means and coupling the first integrator between the reference source and the first input of the comparator, and means for disconnecting the second coupling means and coupling the first source directly to the second input of the comparator.

3. The analog computer circuit of claim 2, additionally comprising means responsive to the indication of the comparator for grounding the input to the second integrator while the output signal of the second integrator is being sampled.

4. The analog computer circuit of claim 3, in which the sampling means samples the output signal of the second integrator during a fixed predetermined time sampling interval, the circuit additionally comprising means responsive to the indication of the comparator for clearing the first and second integrators during a fixed predetermined time clearing interval immediately following the sampling interval, thereby providing continuous cyclic operation.

5. The analog computer circuit of claim 1, in which the sampling means samples the output signal of the second integrator during a fixed predetermined time sampling interval, the circuit additionally comprising means responsive to the indication of the comparator for clearing the first and second integrators during a fixed predetermined time clearing interval immediately following the sampling interval, thereby providing a continuous cyclic operation.

6. An analog computer circuit comprising:

a first input terminal;

a reference source having an output terminal;

a comparator having first and second inputs and an output that produces an indication when the signals at the first and second inputs assume a predetermined amplitude relationship;

a first clearable integrator;

means for coupling the first integrator between one of the terminals and the first input of the comparator;

means for coupling the other terminal to the second input of the comparator;

a second clearable integrator; and means responsive to the indication of the comparator for successively sampling the output signal of the second integrator, clearing the first and second integrators, and enabling the first and second integrators, thereby providing continuous cycling operation.

7. The circuit of claim 6, in which means are provided for grounding the input of the second integrator while its output signal is being sampled.

8. The circuit of claim 6, in which the first and second integrators are operational amplifiers each having a feedback capacitor and a normally open clearing switch connected in parallel across the capacitor, the integrator being cleared while the switch is closed and being enabled while the switch is open.

9. The circuit of claim 8, in which the means for successively sampling, clearing, and enabling comprises: a sample and hold circuit; a first normally open switch coupling the output of the second integrator to the input of the sample and hold circuit; first means for generating a pulse responsive to each indication of the comparator; means responsive to each pulse from the first pulse generating means for closing the first switch for the duration of such pulse; second means for generating a pulse responsive to the end of each pulse from the first pulse generating means; and means responsive to each pulse from the second pulse generating means for closing the clearing switches of the first and second integrators for the duration of such pulse.

10. The circuit of claim 9, in which the first and second pulse generating means are monostable multivibrators connected in tandem.

11. The circuit of claim 10, additionally comprising a third normally open switch connecting the input of the second integrator to ground and means responsive to each pulse from the first pulse generating means for closing the third switch for the duration of such pulse.

12. An analog divider comprising:

a source of signals representing a divisor;

means for integrating the divisor signal;

a source of signals representing a dividend;

means for integrating the dividend signal; and means for sampling the integrated dividend signal when the integrated divisor signal reaches a predetermined level.

References Cited

UNITED STATES PATENTS

| | | | |
|---|---|---|---|
| 3,043,516 | 7/1962 | Abbott et al. | 235—195 |
| 3,171,986 | 3/1965 | Bonner et al. | 235—183 X |
| 3,264,459 | 8/1965 | Ericson | 235—183 |
| 3,308,386 | 3/1967 | Wong | 235—183 X |

MALCOLM A. MORRISON, Primary Examiner

J. F. RUGGIERO, Assistant Examiner

U.S. Cl. X.R.

235—183; 357—229

°0-1050
(5/69)
5787

UNITED STATES PATENT OFFICE
CERTIFICATE OF CORRECTION

Patent No. 3,521,046 Dated July 21, 1970

Inventor(s) Earl LeVell Tippetts

It is certified that error appears in the above-identified patent and that said Letters Patent are hereby corrected as shown below:

Column 3, line 63, change "treminals" to --terminals--.

Column 4, line 32, --all-- should be inserted between "are" and "constants"; line 40, --of-- should be inserted after "input", "intergator" should be --integrator--.

Column 5, line 1, --amplitude-- should be inserted after "predetermined".

SIGNED AND
SEALED
MAR 9 1971

(SEAL)
Attest:

Edward M. Fletcher, Jr.
Attesting Officer

WILLIAM E. SCHUYLER, JR.
Commissioner of Patents